UNITED STATES PATENT OFFICE.

ANDREW A. DUNHAM, OF BAINBRIDGE, NEW YORK, ASSIGNOR TO THE CASEIN MANU-
FACTURING COMPANY, A CORPORATION OF VERMONT.

DRY ALKALI-METAL SILICATE.

1,373,224.  Specification of Letters Patent.  Patented Mar. 29, 1921.

No Drawing.  Application filed December 30, 1919. Serial No. 348,410.

*To all whom it may concern:*

Be it known that I, ANDREW A. DUNHAM, a citizen of the United States, residing at Bainbridge, in the county of Chenango and State of New York, have invented or discovered certain new and useful Improvements in Dry Alkali-Metal Silicates, of which the following is a specification.

This invention has reference to an improvement in the manufacture of dry alkaline silicates, soluble in water, and has particular reference to my co-pending application Serial No. 314,611. I have discovered that in the production of casein glues it is advantageous, under certain conditions, to use a dry alkali metal silicate such as sodium silicate, potassium silicate, etc. One reason for the use of a dry alkali metal silicate is (as set forth in said application No. 314,611) for the purpose of regulating the setting or jelling of casein glues of certain composition. So far as I have been able to determine none of the commercial dry alkali metal silicates on the market answer my purpose perfectly, due to certain objections which are hereinafter set forth.

The ordinary commercial dry alkali metal silicates as found on the market have the property of regulating the jelling or setting quality of certain casein glues, but I find that the use thereof, without exception, presents one or two serious disadvantages, as follows:

First: In certain cases the ordinary commercial dry alkali metal silicate, although having the property of regulating the jelling of casein glues, renders the casein glue, when dissolved in water, much thinner than would be the case if the silicate were not used. In other words, the addition of the ordinary commercial dry alkali metal silicates to casein glues thins the glue to a marked degree, so that when the glue is used, for example, for wood-working purposes, it penetrates too far into the pores of the wood leaving the surface of the wood nearly void of a glue line. It is obvious that the reverse effect is desirable and that the dissolved casein glue should possess a rather high viscosity or heavy body.

Second: The ordinary dry alkali metal silicates on the market are not readily completely soluble, and impart a marked degree of grittiness to the casein glues with which they have been used. This is extremely objectionable in a wood-working glue, on account of the tendency to dull the tools, saws, and knives of the machinery by which the glued materials are milled and worked.

I have discovered a method of drying solutions of alkali metal silicates, as for instance sodium silicate, and overcoming the objectionable features above mentioned. In order to overcome the tendency of the dry silicate to thin casein glues, I find that the method of drying is extremely important, and I have discovered that by drying the ordinary commercial liquid sodium silicate on a surface heated to a temperature of 212° F., or above, then scraping the dry silicate off the said surface, I can produce a dry silicate which does not have the property of thinning casein glues but, quite the reverse, has the property of giving the casein glues more viscosity or body, yet controlling the time of setting or jelling as outlined in my co-pending application No. 314,611. If the commercial liquid sodium silicate to be dried, is very dense it may be diluted with water to the desired density for proper handling on the drying surface. I find that a density of 12° B., or thereabout, permits easy manipulation of the sodium silicate, or other silicate, in the drying operation.

The alkali metal silicates, dried according to the above process, still show some grittiness when mixed with casein glue compositions. I have discovered that the addition of a small amount of casein to the liquid silicate before drying the mass on the heated surface entirely prevents the grittiness above mentioned. The addition of from two per cent., to ten per cent. (2%–10%) by weight, of casein to the sodium silicate gives a very useful result. No other alkali is required to dissolve the casein except the sodium silicate itself, although if deemed advisable the casein may be dissolved by other alkalis and then added to the silicate to be dried. In either case the solution to be evaporated will comprise an alkali metal silicate and casein.

It is obvious that any suitable heated surface may be used for the purpose of drying the liquid silicate or the combination of silicate with a small percentage of casein, but I have found that a steam heated rotating cylinder heated to a temperature of 212° F. or above and so arranged that the cylinder takes up a thin film of the solution to be dried, allowing it to dry in one revolution, and provided with a scraper or knife to remove the film after it is dried, is a very satisfactory apparatus to use for the purpose. In place of a single steam heated cylinder two steam heated cylinders mounted adjacent to each other and rotating downwardly with the necessary equipment for removing the dried material may be used. The so-called "Just" machine, such as is described in U. S. Patent #712,545, is well adapted for this purpose.

The film is practically dry, light in weight, of a flaky character, and can be readily reduced to a fine powder. The material is porous, friable and but slightly hygroscopic, enabling same to be kept with absorption of but little moisture.

Having thus described my invention or discovery I claim and desire to secure by Letters Patent.

1. The herein described product, being a practically dry, porous, flaky material consisting of an alkali metal silicate and casein.

2. The herein described product, being a practically dry, porous, flaky material consisting of sodium silicate and casein.

3. There herein described product, being a practically dry, porous, flaky material produced by evaporating a solution of an alkali metal silicate and casein.

4. The herein described product, being a practically dry, porous, flaky material produced by evaporating a solution of sodium silicate and casein.

5. The herein described product, being a practically dry, porous, flaky material, of a friable character so as to be readily reduced to a fine powder, consisting of an alkali metal silicate and casein.

6. The herein described product, being a practically dry, porous, flaky material, of a friable character so as to be readily reduced to a fine powder, consisting of sodium silicate and casein.

7. The herein described product, being a practically dry, porous, flaky material, of a friable character so as to be readily reduced to a fine powder, consisting of an alkali metal silicate and casein, said material being produced by evaporating a solution of an alkaline metal silicate and casein.

8. The herein described product, being a practically dry, porous, flaky material, of a friable character so as to be readily reduced to a fine powder, consisting of sodium silicate and casein, said material being produced by evaporating a solution of sodium silicate and casein.

In testimony whereof I affix my signature.

ANDREW A. DUNHAM.